(12) United States Patent
Fischer et al.

(10) Patent No.: US 9,148,589 B2
(45) Date of Patent: Sep. 29, 2015

(54) IMAGE CAPTURE USING INFRARED AND VISIBLE SPECTRUM LIGHT

(71) Applicants: Ronald Fischer, Hollywood, CA (US); Abraham Rank, Lake Balboa, CA (US)

(72) Inventors: Ronald Fischer, Hollywood, CA (US); Abraham Rank, Lake Balboa, CA (US)

(73) Assignee: NBCUniversal, LLC, New York, NY (US)

( * ) Notice: Subject to any disclaimer, the term of this patent is extended or adjusted under 35 U.S.C. 154(b) by 411 days.

(21) Appl. No.: 13/674,564

(22) Filed: Nov. 12, 2012

(65) Prior Publication Data

US 2014/0132775 A1    May 15, 2014

(51) Int. Cl.
*H04N 5/33* (2006.01)
*H04N 5/225* (2006.01)
*H04N 7/18* (2006.01)

(52) U.S. Cl.
CPC .................................... *H04N 5/332* (2013.01)

(58) Field of Classification Search
CPC ..... H04N 5/332; H04N 5/33; H04N 5/23212; H04N 9/04; H04N 5/2251; H04N 5/2256; H04N 5/23296; H04N 5/232; G02B 23/12; G06T 5/002; G06T 5/50; G06T 5/20
See application file for complete search history.

(56) References Cited

U.S. PATENT DOCUMENTS

| | | | |
|---|---|---|---|
| 2005/0012843 A1* | 1/2005 | Kuwakino et al. | 348/335 |
| 2006/0091328 A1* | 5/2006 | Kanazawa | 250/504 R |
| 2011/0199482 A1* | 8/2011 | Morgan | 348/143 |
| 2012/0154596 A1* | 6/2012 | Wajs | 348/164 |
| 2012/0281081 A1* | 11/2012 | Atif et al. | 348/79 |
| 2013/0249301 A1* | 9/2013 | Smoot et al. | 307/104 |

* cited by examiner

*Primary Examiner* — Jefferey Harold
*Assistant Examiner* — Sean Haiem (57) ABSTRACT

A device (e.g., an image capture device, or camera) includes a sensor and a filtering apparatus. Incident light received by the device includes visible spectrum light and infrared light. The filtering apparatus can alternately filter out the infrared light while allowing the sensor to be exposed to the visible spectrum light, and filter out the visible spectrum light while allowing the sensor to be exposed to the infrared light. For example, the filtering apparatus can include a shutter that, when in a first position, filters out the infrared light and, when in a second position, filters out the visible spectrum light. In particular, the shutter can be a rotating shutter that includes a visible spectrum pass filter in one sector and an infrared pass filter in another sector.

23 Claims, 7 Drawing Sheets

IMAGE CAPTURE USING INFRARED AND VISIBLE SPECTRUM LIGHT

BACKGROUND

In contemporary filmmaking and in other applications such as newscasts, chroma keying is commonly used to change a background or remove an object (or part of an object) from an image. To change the background, for example, a scene is "filmed" (recorded) in front of a green screen or blue screen. The portions of the recorded image that match the color of the screen are then removed digitally. The removed portions can then be replaced with a different background to form an image that is a composite of the recorded image and the new background.

Conventional chroma keying can be challenging. For one thing, the color of the key (e.g., green) cannot appear in the scene outside the portion that is to be removed and replaced, because all parts of the recorded scene that include the color of the key will be replaced in the composited image. If, for example, a character wears green in front of a green screen, the green part of the character's clothes will be replaced as well as the green background. Conventional chroma keying can also make recording a scene more complex when, for example, one character is wearing green and the other character is wearing blue. The green-clothed character would need to be filmed in front of a blue screen, and the blue-clothed character in front of a green screen.

SUMMARY

In an embodiment according to the present invention, a device (e.g., an image capture device, or camera) includes a sensor and a filtering apparatus. Incident light received by the device includes visible spectrum light and infrared light. The filtering apparatus can alternately filter out the infrared light (while allowing the sensor to be exposed to the visible spectrum light) and filter out the visible spectrum light (while allowing the sensor to be exposed to the infrared light). In one such embodiment, the filtering apparatus includes a shutter that, when in a first position, filters out the infrared light and, when in a second position, filters out the visible spectrum light. In particular, in one such embodiment, the shutter is a rotating shutter that includes a visible spectrum pass filter in one sector of the shutter and an infrared pass filter in another sector of the shutter. Thus, instead of using a beam splitter and two cameras, where one camera receives the infrared image and the other camera receives the visible spectrum image, a single camera can be used. A system based on a single camera is simpler to use and costs less than a system that uses two cameras and a beam splitter.

In one embodiment, a surface of an object in the field of view of the device includes a material that reflects infrared light. In such an embodiment, light from an infrared illuminator is reflected from the surface toward the filtering apparatus and captured by the sensor as described above.

In another embodiment, a surface of an object in the field of view of the device includes a fluorescent material that converts incident light into infrared light, which is emitted from the surface toward the filtering apparatus and captured by the sensor as described above.

In yet another embodiment, a surface of an object in the field of view of the device includes an energy-absorbing (e.g., phosphorescent) material that converts incident light into infrared light, which is emitted from the surface toward the filtering apparatus and captured by the sensor as described above. In comparison to the fluorescent material embodiment described above, the phosphorescent material can emit infrared light for a relatively long period of time after it has been exposed to light.

In one embodiment, the device includes a focus correction element to focus the incident light. Because infrared light may focus at a different distance relative to visible spectrum light, the focus correction element utilizes, in one embodiment, an apochromatic lens that corrects chromatic aberration in the visible spectrum and in the near infrared spectrum. In another embodiment, the focus correction element utilizes a lens that corrects chromatic aberration in the visible spectrum and a second element to focus the infrared light on the sensor. In one such embodiment, the second element is active only during the period when the sensor is exposed to the infrared light.

In one embodiment, a surface of a second object in viewing range of the device includes a material that absorbs infrared light. The use of infrared-absorptive material can improve matteing, by suppressing reflections in the infrared range.

The device (e.g., camera) can be used in a system for real-time and/or offline keying and matteing to remove and/or replace, for example, a background and/or an object from an image generated using the image data captured and recorded by the device. The device can be used in filmmaking, for example. In effect, instead of using the color green or blue for chroma keying and matteing, infrared is used. Consequently, greater flexibility is provided with regard to the variety of colors that can be used in the scene being recorded. For example, it is not necessary to remove shades of green or blue from the scene.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments according to the present invention and, together with the description, serve to explain the principles of the disclosure. The drawings are not necessarily to scale. Also, the embodiments illustrated in the drawings may include elements other than those shown, and elements may be arranged differently from the illustrated arrangement (e.g., two elements shown as being adjacent to each other may be separated by an intervening element or by space).

DETAILED DESCRIPTION

Reference will now be made in detail to various embodiments according to the present invention, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present invention, numerous specific details are set forth in order to provide a thorough understanding of the present invention. However, it will be understood that the present disclosure may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "removing," "receiving," "storing," "excluding," "keying, "matteing," or the like, refer to actions and processes (e.g., flowchart 80 of FIG. 8) of a computer system or similar electronic computing device or processor (e.g., system 60 of FIG. 6). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
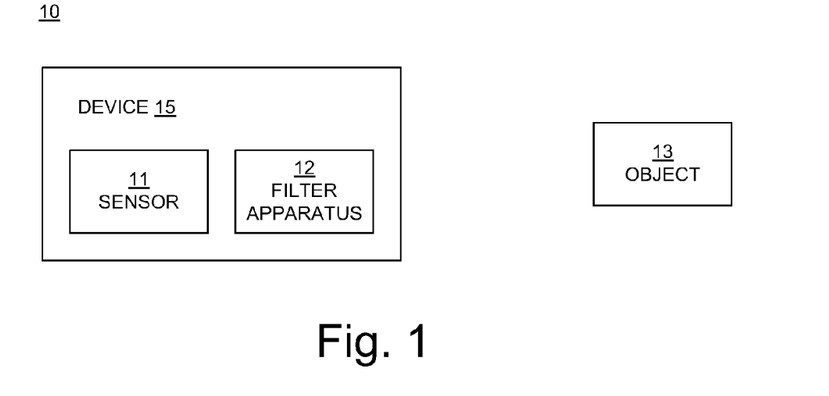
FIG. 1 is a block diagram of an example of a system for image capture in an embodiment according to the present invention.

FIG. 1 is a block diagram of an example of a system 10 in an embodiment according to the present invention. In the example of FIG. 1, the system 10 includes an image sensor 11, a filter apparatus 12, and an object 13.

The sensor 11 can be, but is not limited to, a charge-coupled device (CCD) or a complementary metal-oxide-semiconductor (CMOS) sensor. The sensor 11 can include a color filter array (not shown), such as a Bayer mask, that includes red, green, and blue (R, G, and B) color filters.

In one embodiment, the sensor 11 and the filter apparatus 12 are implemented as part of an image capture device 15, or camera. The device 15 can capture a single image frame (a single frame of image data) at a time, or it can capture multiple such frames in rapid succession (e.g., as in a motion picture, or movie). The device 15 can include other elements in addition to those shown and described.

The object 13 represents an example of an object that is within the field of view of the device 15. The object 13 may be a background surface (e.g., a screen or wall), some other type of object, or a person, for example. There may be other objects within the field of view of the device 15.

In general, in embodiments according to the present invention, the object 13 is a source of infrared light. More specifically, the object 13 is made of, or is covered or coated with, wholly or in part, a material that causes the object to transmit infrared light to the device 15. For example, that material may be a material that reflects infrared light from an infrared illuminator toward the device 15, or it may be a material that absorbs light (e.g., such as, but not limited to, visible spectrum light) and emits infrared light toward the device 15. Additional information is provided in conjunction with FIGS. 4A and 4B, below.

In one embodiment, the infrared light reflected from or emitted by the object 13 is in the near-infrared range. The visible spectrum light may be ambient light including light emitted from natural and artificial light sources and light reflected from other objects in the field of view of the device 15.

In general, the filtering apparatus 12 of FIG. 1 alternates between: i) filtering out the infrared light and exposing the sensor 11 to the visible spectrum light, and ii) filtering out the visible spectrum light and exposing the sensor 11 to the infrared light. When the sensor 11 is receiving the infrared light from the object 13, the object 13 would appear light (white) in an image generated using the image data. When the sensor 11 is receiving the visible spectrum light, the object 13 would appear dark (black) in an image generated using the image data.

Figure 2A:
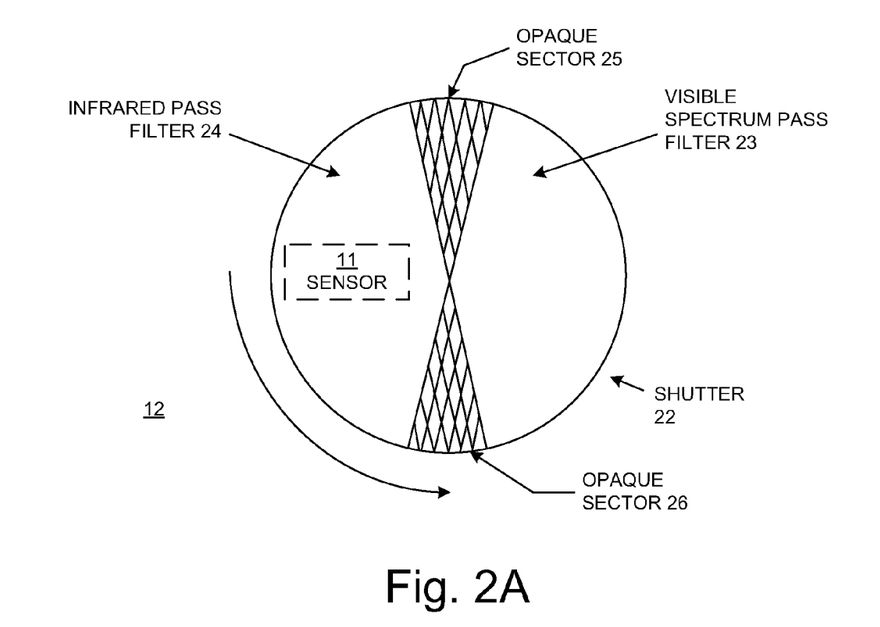
FIGS. 2A and 2B illustrate examples of a filter apparatus (e.g., a rotating shutter) in embodiments according to the present invention.
Figure 2B:
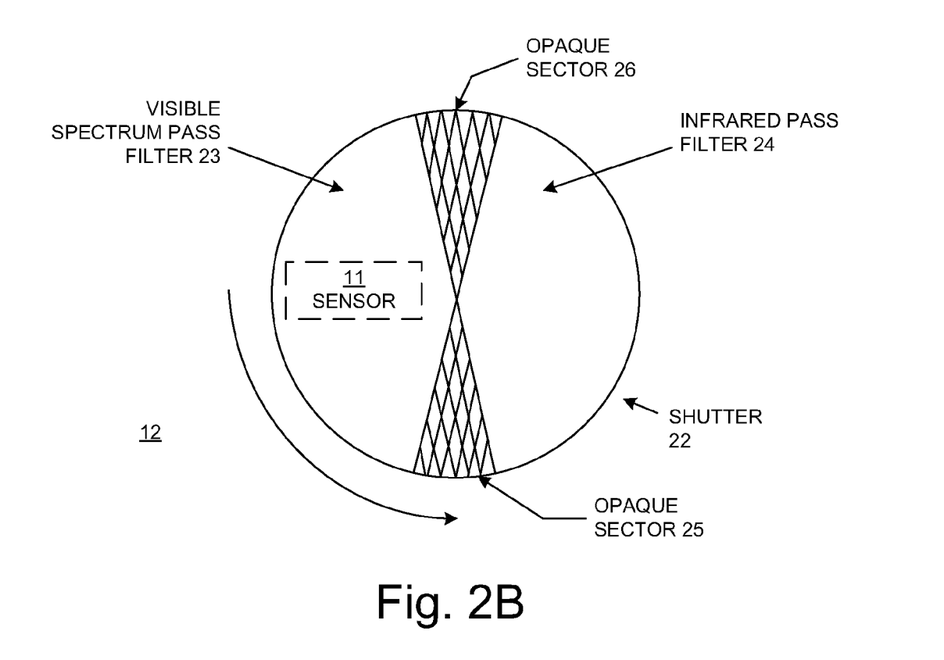

With reference to FIGS. 2A and 2B, in one embodiment, the filtering apparatus 12 includes a shutter 22 that, when in a first position, filters out the infrared light and, when in a second position, filters out the visible spectrum light. In one such embodiment, the shutter 22 is a rotating disk (or disk-like) shutter that includes a visible spectrum pass filter 23 in one sector of the shutter and an infrared pass filter 24 in another sector of the shutter. In one embodiment, the visible spectrum pass filter 23 and the infrared pass filter 24 are separated by opaque sectors 25 and 26. The opaque sectors 25 and 26 block both visible spectrum light and infrared light from reaching the sensor 11. The opaque sectors 25 and 26 effectively open and close the exposure time on the sensor 11.

As shown in FIG. 2A, as the shutter 22 rotates, the infrared pass filter 24 moves to a position in front of the sensor 11, allowing infrared light to reach the sensor while filtering out visible spectrum light. As the shutter 22 continues to rotate, the visible spectrum pass filter 23 moves to a position in front of the sensor 11, allowing visible spectrum light to reach the sensor while filtering out infrared light, as shown in FIG. 2B.

In the example of FIGS. 2A and 2B, the visible spectrum pass filter 23 occupies about half of the shutter 22, and the infrared pass filter 24 occupies the remaining portion of the shutter, minus the opaque sectors 25 and 26; however, the present invention is not so limited. The two filters 23 and 24 do not necessarily have to be the same size. Similarly, the opaque sectors 25 and 26 do not necessarily have to be the same size. The sizes of the various sectors can be selected to establish the exposure times of the sensor 11 to visible spectrum light and infrared light, depending on the application.

During each revolution of the shutter 22, the sensor 11 of FIG. 1 outputs a frame of image data in response to exposure to the visible spectrum light (a "visible spectrum frame"), and also outputs a frame of image data in response to exposure to the infrared light (an "infrared frame"). The visible spectrum frame and the infrared frame produced per revolution are offset from each other by about one-half of the time needed to complete a revolution.

In the example of FIGS. 2A and 2B, the frame rate (and hence, the exposure time) of the device 15 is based on the rate of rotation of the shutter 22. For example, the rotating shutter 22 may rotate at a rate of 24 revolutions per second, corresponding to a frame rate of 24 frames per second, in which case 12 frames of visible spectrum image data and 12 frames of infrared spectrum image data can be output per second.

The visible spectrum frames and the infrared frames output from the device 15 are interleaved with one another. Because the frames are interleaved, the visible spectrum and infrared frames can be readily paired and aligned in time (synchronized) for subsequent image processing including keying and matteing operations. Additional information is provided in conjunction with FIG. 5 below.

Thus, in embodiments according to the present invention, a single camera can be used in place of a system that includes a beam splitter, a first camera that receives the infrared image, and a second camera that receives the visible spectrum image. A system based on a single camera is simpler to use and costs less than a system that uses two cameras and a beam splitter.

Figure 3A:
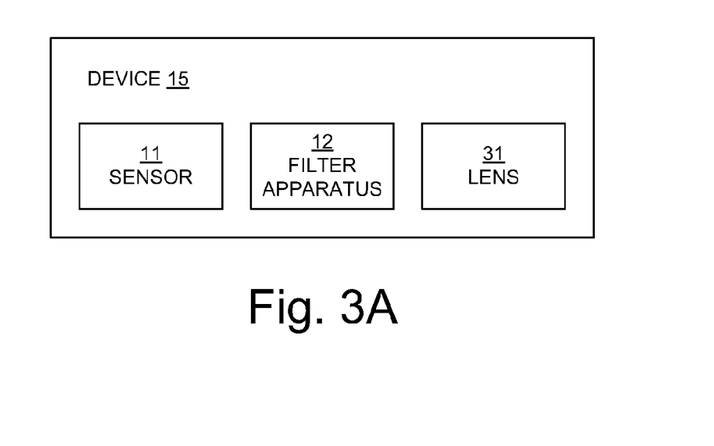
FIG. 3A illustrates an example of an element for focusing visible spectrum light and infrared light in an embodiment according to the present invention.

Infrared light and visible spectrum light focus at different distances. In one embodiment, with reference to FIG. 3A, the device 15 includes a lens 31 (e.g., an apochromatic lens) between the sensor 11 and the object 13 (FIG. 1). The lens 31 corrects chromatic aberration in both the infrared spectrum (e.g., the near infrared spectrum) and the visible spectrum, to account for the differences in focus between the infrared light and the visible spectrum light.

Figure 3B:
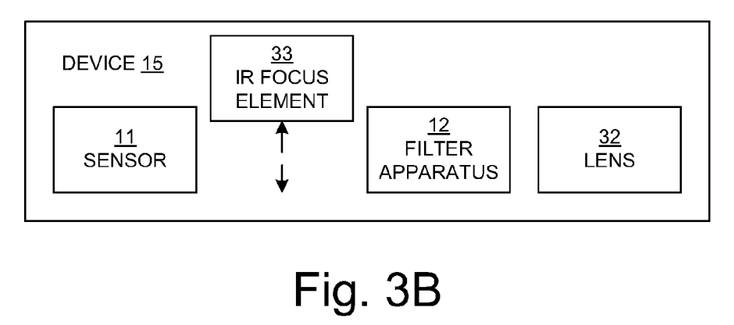
FIG. 3B illustrates an example of an element for focusing visible spectrum light and an element for focusing infrared light in an embodiment according to the present invention.

In another embodiment, with reference to FIG. 3B, the device 15 includes a lens 32 (e.g., an achromatic lens) and a second element 33 between the sensor 11 and the object 13 (FIG. 1). The lens 32 corrects chromatic aberration in the visible spectrum. The second element 33 focuses the infrared (IR) light on the sensor 11. In one such embodiment, the second element 33 is active only during the period in which the sensor 11 is exposed to the infrared light (e.g., when the infrared pass filter 24 is in front of the sensor).

Figure 4A:
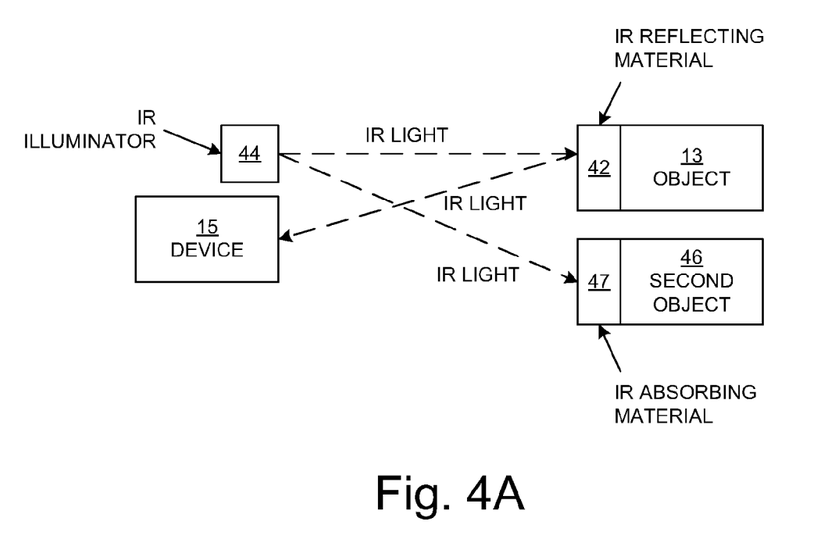
FIG. 4A illustrates an example of a system using an infrared light reflective material in an embodiment according to the present invention.

As mentioned above, the object 13 is made of, or is covered or coated with, wholly or in part, a material that causes the object to transmit infrared light to the device 15. With reference now to FIG. 4A, in one embodiment, the object 13 includes a material 42 that reflects infrared light.

In such an embodiment, light from an infrared illuminator 44 is reflected by the material 42 toward the device 15. The infrared illuminator 44 can be synchronized with the filter apparatus 12 of FIG. 1 (e.g., the shutter 22 of FIGS. 2A and 2B) so that, when the sensor 11 is being exposed to infrared light, the infrared illuminator is flashed on.

In one embodiment, a second object 46 in viewing range of the device 15 includes a material 47 that absorbs infrared light. That is, the second object 46 can be covered or coated with, wholly or in part, such a material. The use of infrared-absorptive material in other objects in the scene being recorded can improve matteing, by suppressing reflections in the infrared range.

Figure 4B:
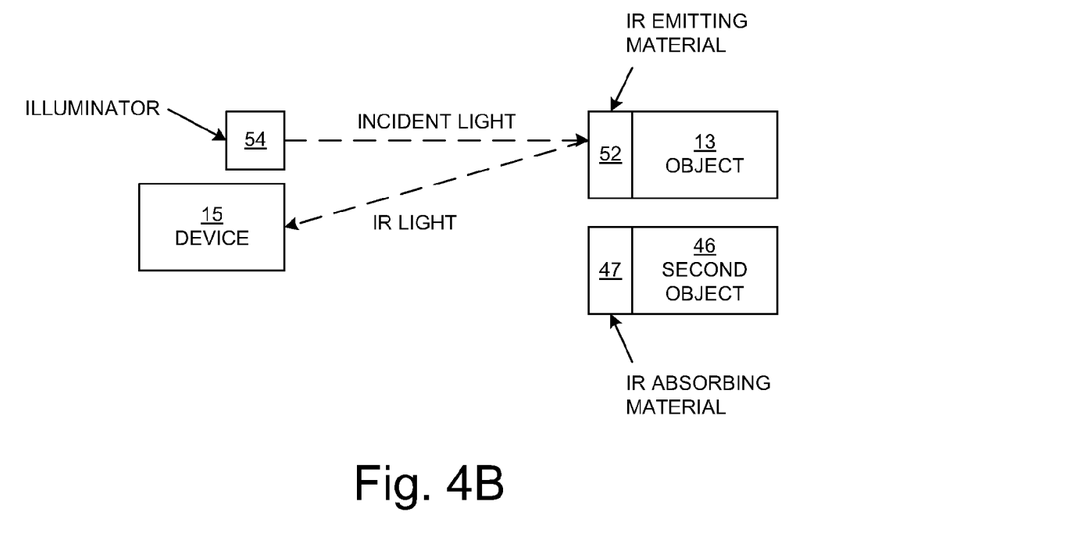
FIG. 4B illustrates an example of a system using an infrared light emitting material in an embodiment according to the present invention.

With reference next to FIG. 4B, in another embodiment, the object 13 includes a material 52 that down-converts incident light into infrared light. The incident light may be light (e.g., visible spectrum light) provided by an illuminator 54 and/or the incident light may be ambient light (e.g., natural lighting). In one such embodiment, the material 52 is a fluorescent material that converts incident light into infrared light. In another such embodiment, the material 52 is an energy-absorbing (e.g., phosphorescent) material (e.g., a quantum nanodot infrared phosphorescent dye) that converts incident light into infrared light.

In comparison to fluorescent material, a phosphorescent material can emit infrared light for a relatively long period of time after it has been exposed to light. Thus, the use of phosphorescent material on the object 13 provides greater flexibility with regard to lighting the scene. For example, it is possible to expose the phosphorescent material to light one time and, in response, the phosphorescent material can emit infrared light for an interval of time of perhaps several hours, while for the same length interval it might be necessary to expose a fluorescent material to light multiple times or even continuously.

Figure 5:
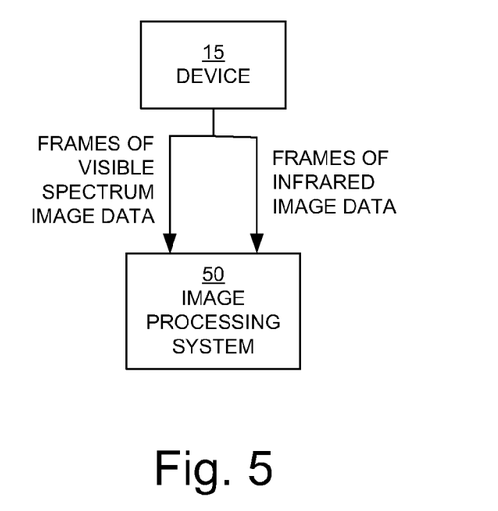
FIG. 5 is a block diagram of a system for capturing and processing image data in an embodiment according to the present invention.

FIG. 5 is a block diagram showing an image processing system 50 coupled to the device 15 in an embodiment according to the present invention. The device 15 can output frames of image data to the image processing system 50 for subsequent processing. The image processing system 50 can be used for real-time and/or offline keying and matteing to remove and/or replace, for example, an object (such as a background) from an image generated using the image data captured and recorded by the device 15.

In the example of FIG. 5, there are two parallel channels between the device 15 and the image processing system 50. One channel carries visible spectrum frames, and the other channel carries infrared frames. As mentioned above, a visible spectrum frame and an infrared frame produced by one revolution of the shutter 22 (FIGS. 2A and 2B) will be offset in time (e.g., by about one-half the time needed to complete the revolution). The image processing system 50 can utilize a technique such as an optical flow technique to pair up the visible spectrum frame and the infrared frame. More specifically, the image processing system 50 can pair up the visible spectrum frame and the infrared frame produced by one revolution of the shutter 22, and can align those frames in time by shifting the visible spectrum frame in time by the amount of the offset, shifting the infrared frame in time by the amount of the offset, or shifting both frames in time by some amount that compensates for the offset.

Figure 6:
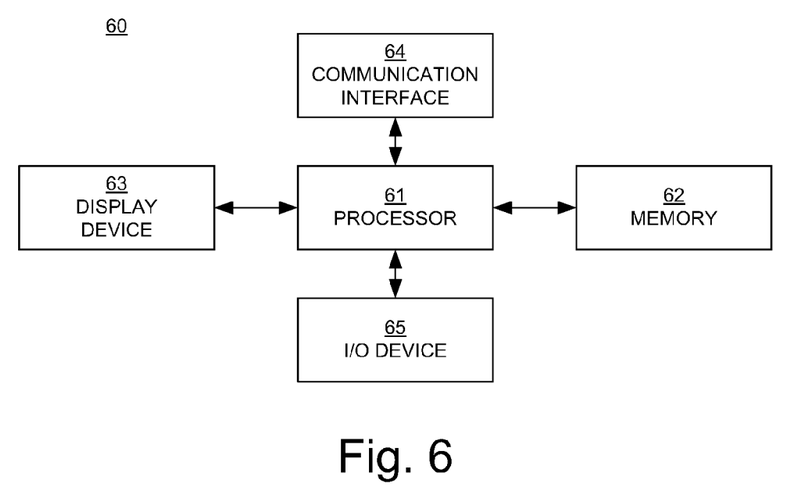
FIG. 6 is a block diagram of an example of a computing system upon which embodiments according to the present invention can be implemented.

The image processing system 50 can be implemented using a system such as the computing system 60 of FIG. 6. The computing system 60 broadly represents any single or multiprocessor computing device or system capable of executing computer-readable instructions. Examples of a computing system 60 include, without limitation, a desktop, laptop, tablet, or handheld computer.

In its most basic configuration, the computing system 60 may include at least one processor 61 and at least one memory 62. The processor 61 generally represents any type or form of processing unit capable of processing data or interpreting and executing instructions. In certain embodiments, the processor 61 may receive instructions from a software application or module. These instructions may cause the processor 61 to perform the functions of one or more of the example embodiments described herein.

The memory 62 generally represents any type or form of volatile or non-volatile storage device or medium capable of storing data and/or other computer-readable instructions. In certain embodiments, the computing system 60 may include both a volatile memory unit (such as, for example, the memory 62) and a non-volatile storage device (not shown).

The computing system 60 also includes a display device 63 that is operatively coupled to the processor 61. The display device 63 is generally configured to display a graphical user interface (GUI) that provides an easy to use interface between a user and the computing system.

The communication interface 64 broadly represents any type or form of communication device or adapter capable of facilitating communication between the computing system 60 and one or more additional devices (e.g., the device 15 of FIG. 5). For example, the communication interface 64 may facilitate communication between the computing system 60 and a private or public network including additional computing systems such as the device 15. Examples of a communication interface 64 include, without limitation, a wired network interface (such as a network interface card), a wireless network interface (such as a wireless network interface card), a modem, and any other suitable interface. The communication interface 64 may also indirectly provide such a connection through any other suitable connection. The communication interface 64 may also represent a host adapter configured to facilitate communication between the computing system 60 and one or more additional network or storage devices via an external bus or communications channel.

As illustrated in FIG. 6, the computing system 60 may also include at least one input/output (I/O) device 65. The I/O device 65 generally represents any type or form of input device capable of providing/receiving input or output, either computer- or human-generated, to/from the computing system 60. Examples of an I/O device 65 include, without limitation, a keyboard, a pointing or cursor control device (e.g., a mouse), a speech recognition device, or any other input device.

Many other devices or subsystems may be connected to computing system 60. Conversely, all of the components and devices illustrated in FIG. 6 need not be present to practice the embodiments described herein. The devices and subsystems referenced above may also be interconnected in different ways from that shown in FIG. 6. The computing system 60 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into the computing system 60. All or a portion of the computer program stored on the computer-readable medium may then be stored in the memory 62. When executed by the processor 61, a computer program loaded into the computing system 60 may cause the processor 61 to perform and/or be a means for performing the functions of the example embodiments described and/or illustrated herein. Additionally or alternatively, the example embodiments described and/or illustrated herein may be implemented in firmware and/or hardware.

Figure 7:
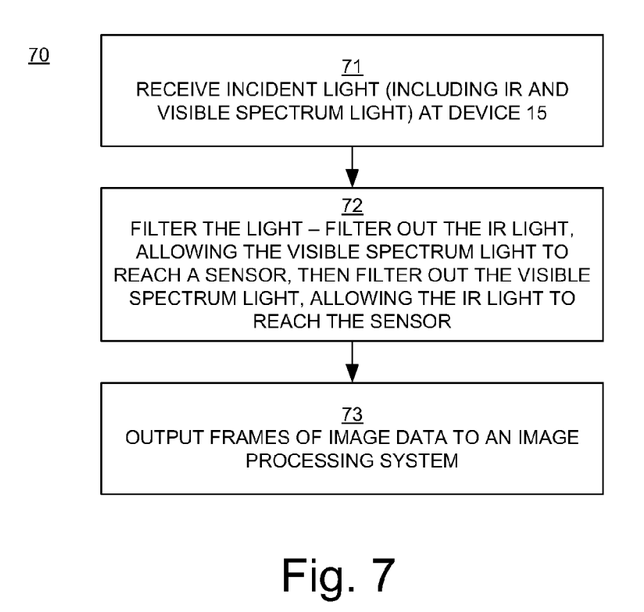
FIG. 7 is a flowchart of an example of an image capture method in an embodiment according to the present invention.

FIG. 7 is a flowchart 70 of an example of operations for capturing image data in embodiments according to the present invention. In block 71, incident light is received by an image capture device (e.g., the device 15 of FIG. 1, such as a camera), where the incident light includes visible spectrum light and infrared light.

In block 72 of FIG. 7, a filter apparatus (e.g., the filter apparatus 12 of FIG. 1, and more specifically the shutter 22 of FIGS. 2A and 2B) in the device is moved (e.g., rotated) between a first position and a second position. Accordingly, the infrared light is allowed to pass to a sensor (e.g., the sensor 11 of FIG. 1) while the sensor is shielded from the visible spectrum light. Also, the visible spectrum light is allowed to pass to the sensor while the sensor is shielded from the infrared light.

In block 73 of FIG. 7, frames of image data from the device (from the sensor) are output to, for example, an image processing system. The frames of image data will include frames (infrared frames) that were produced when the infrared light reached the sensor 11 and the sensor was shielded from the visible spectrum light, and will also include frames (visible spectrum frames) that were produced when the visible spectrum light reached the sensor and the sensor was shielded from the infrared light. In one embodiment, the infrared frames and the visible spectrum frames are produced and output in an alternating fashion as described above in conjunction with FIGS. 2A and 2B, and thus the infrared and visible spectrum frames can be readily correlated (e.g., synchronized) with one another for subsequent processing (e.g., keying and matteing).

Figure 8:
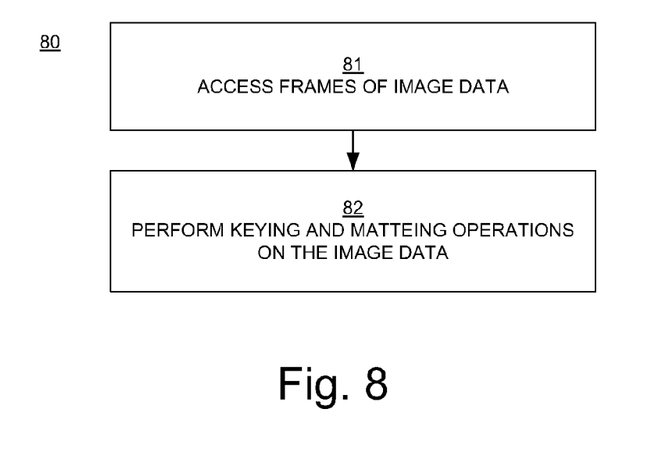
FIG. 8 is a flowchart of an example of a method for processing image data in an embodiment according to the present invention.

FIG. 8 is a flowchart 80 of examples of operations performed by an image processing system (e.g., the image processing system 50 of FIG. 5). The flowchart 80 can be implemented as computer-executable instructions residing on some form of computer-readable storage medium (e.g., using the computing system 60 of FIG. 6).

In block 81 of FIG. 8, image data captured by an image capture device (e.g., a camera, such as the device 15 of FIG. 1) is accessed by the image processing system.

In block 82 of FIG. 8, keying and matteing operations are performed to remove and/or replace, for example, an object (such as a background) from an image generated using the image data. The keying and matteing operations can be performed in real time (as the image data is captured and accessed) and/or offline (e.g., during post-processing).

Figure 9A:
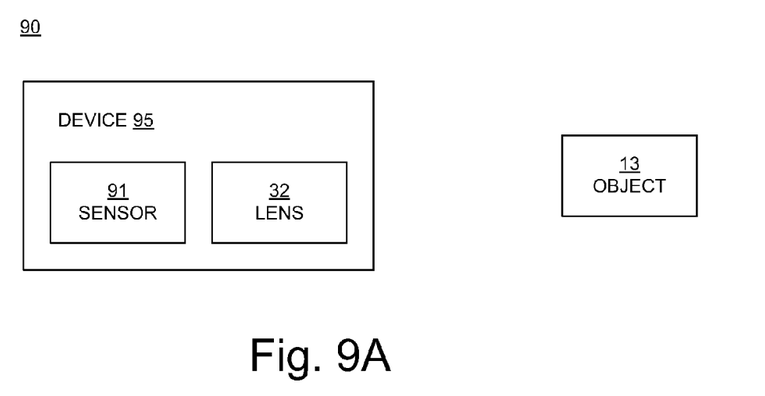
FIG. 9A is a block diagram of an example of a system for image capture in an embodiment according to the present invention.

FIG. 9A is a block diagram of another example of a system 90 in an embodiment according to the present invention. In the example of FIG. 9, the system 90 includes a sensor 91, a lens 32 (described above), and an object 13 (described above). In one embodiment, the sensor 91 and the lens 32 are implemented as part of an image capture device 95, or camera.

Figure 9B:
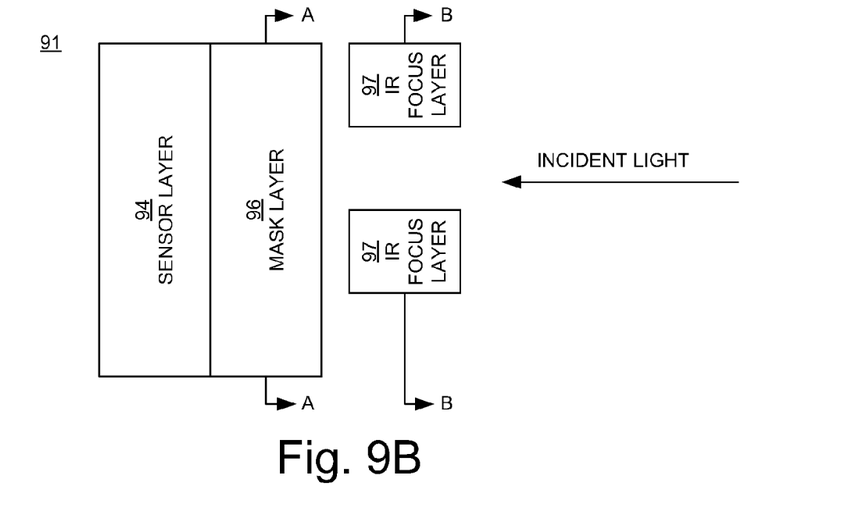
FIG. 9B illustrates a cross-section view of a portion of a sensor in an embodiment according to the present invention.
Figure 9C:
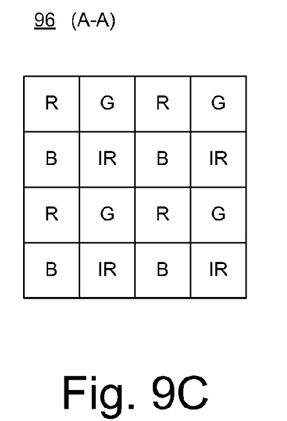
FIG. 9C illustrates a mask layer of a sensor in an embodiment according to the present invention.

FIG. 9B illustrates a cross-sectional view of a portion of the sensor 91. In the example of FIG. 9B, the sensor 91 may include, but is not limited to, a CCD or CMOS sensor layer 94. A mask layer 96, similar to a Bayer mask and illustrated in FIG. 9C, is located over the layer 94. An infrared focus layer 97, illustrated in FIG. 9D, is located over the layer 94.

FIG. 9C illustrates a top-down view of a portion of the sensor 91, illustrating the mask layer 96. The mask layer 96 is similar to a Bayer mask but includes infrared (IR) light filtering elements or pixels in addition to visible spectrum light filtering elements, e.g., red (R), green (G), and blue (B) filtering elements or pixels. Generally speaking, the mask layer 96 can be described as a mosaic of infrared and visible spectrum light filtering elements that, in one embodiment, are arranged in a repeating pattern. The pattern of R, G, B, and IR filtering elements can be different than that illustrated in FIG. 9C. Also, the various filtering elements can be the same size or different sizes. For example, the IR light filtering elements may be smaller than the R, G, and B filtering elements.

In the mask layer 96, the R filtering elements pass red light to the sensor layer 94 (while blocking other color light and infrared light), the G filtering elements pass green light to the sensor layer (while blocking other color light and infrared light), the B filtering elements pass blue light to the sensor layer (while blocking other color light and infrared light), and the IR filtering elements pass infrared light (while blocking visible spectrum light). Thus, in contrast to the embodiments described in combination with FIG. 1, the filtering is done, in essence, at the sensor 91 using the mask layer 96 in lieu of the filter apparatus 12.

Figure 9D:
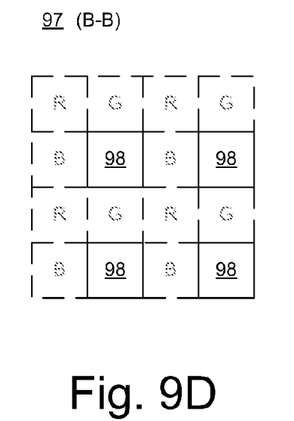
FIG. 9D illustrates a focus layer of a sensor in an embodiment according to the present invention.

FIG. 9D illustrates a top-down view of a portion of the infrared focus layer 97. In one embodiment, the infrared focus layer 97 includes, essentially, a lens 98 over each IR filtering element (but not over the R, G, and B elements) in the mask layer 96. Each lens 98 focuses infrared light on the corresponding IR filtering element in the mask layer 96. Thus, in contrast to the embodiments described in combination with FIG. 3B, the infrared light is focused using a focus element at the sensor 91 in lieu of the second (IR focus) element 33.

In summary, in embodiments according to the present invention, infrared light is used for chroma keying and matteing instead of the color green or blue, for example. Consequently, greater flexibility is provided with regard to the variety of colors that can be used in the scene being recorded. For example, it is not necessary to remove shades of green or blue from the scene.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment, accessible through a Web browser or other remote interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present invention has been described in particular embodiments, it should be appreciated that the invention should not be construed as limited by such embodiments, but rather construed according to the below claims.

What is claimed is:

1. A device comprising:
a sensor operable for sensing light from an object that is a source of infrared light and further operable for detecting visible spectrum light; and
a filtering apparatus between the sensor and the object, the filtering apparatus comprising a shutter that rotates about an axis, the shutter having a first sector that filters out the infrared light and exposes the sensor to the visible spectrum light, the shutter also having a second sector that filters out the visible spectrum light and exposes the sensor to the infrared light; wherein the sensor outputs a frame of image data in response to exposure to the visible spectrum light and a frame of image data in response to exposure to the infrared light.

2. The device of claim 1, wherein the first sector comprises a visible light spectrum pass filter and the second sector comprises an infrared pass filter.

3. The device of claim 1, wherein the object reflects infrared light from an infrared illuminator toward the filtering apparatus.

4. The device of claim 1, wherein the object comprises a material selected from the group consisting of: a fluorescent material that converts incident light into the infrared light received by the sensor; and a phosphorescent material that converts incident light into the infrared light received by the sensor.

5. The device of claim 1, further comprising a second object having a surface comprising a material that absorbs incident infrared light.

6. The device of claim 1, further comprising an apochromatic lens between the sensor and the object, wherein the apochromatic lens corrects chromatic aberration in the visible spectrum and in the near infrared spectrum.

7. The device of claim 1, further comprising:
 a lens that corrects chromatic aberration in the visible spectrum; and
 an element to focus the infrared light on the sensor.

8. A system comprising:
 a camera comprising a sensor and a shutter; and
 an object having a surface comprising a material that causes the shutter to receive infrared light from the object, wherein the shutter also receives visible spectrum light;
 wherein the shutter rotates around its center, the shutter having a first sector that filters out the visible light spectrum so that the sensor is exposed to the infrared light while shielded from the visible spectrum light, the shutter also having a second sector that filters out the infrared light so that the sensor is exposed to the visible spectrum light while shielded from the infrared light.

9. The system of claim 8, further comprising an image processing system operable for receiving a frame of image data from the sensor and for excluding the object from an image that is generated using the image data.

10. The system of claim 8, wherein the shutter comprises an infrared pass filter in the first sector and a visible light spectrum pass filter in the second sector.

11. The system of claim 8, further comprising an infrared illuminator, wherein the material comprises a material that reflects infrared light from the infrared illuminator.

12. The system of claim 8, wherein the material comprises a material selected from the group consisting of: a fluorescent material that converts incident light into infrared light; and a phosphorescent material that converts incident light into infrared light.

13. The system of claim 8, wherein the camera further comprises an apochromatic lens that corrects chromatic aberration in the visible spectrum and in the near infrared spectrum.

14. The system of claim 8, wherein the camera further comprises a lens that corrects chromatic aberration in the visible spectrum, wherein the camera further comprises an element to focus the infrared light on the sensor.

15. The system of claim 8, further comprising a second object having a surface comprising a material that absorbs infrared light.

16. A method comprising:
 receiving incident light at a shutter in a camera, the incident light comprising visible spectrum light and infrared light;
 rotating the shutter through a first position and a second position, wherein the shutter has a first sector comprising an infrared pass filter that allows the infrared light to pass to a sensor while shielding the sensor from the visible spectrum light when the shutter is in the first position, and wherein the shutter has a second sector comprising a visible light spectrum pass filter that allows the visible spectrum light to pass to the sensor while shielding the sensor from the infrared light when the shutter is in the second position; and
 outputting frames of image data from the sensor.

17. The method of claim 16, wherein the infrared light is received from an object having a surface comprising a material selected from the group consisting of: a material that reflects infrared light; a fluorescent material that converts incident light into infrared light; and a phosphorescent material that converts incident light into infrared light.

18. The method of claim 16, further comprising correcting focus for the incident light to account for differences in focus between the infrared light and the visible spectrum light.

19. A device comprising:
 a sensor operable for sensing infrared light and visible spectrum light, said sensor comprising a mask layer coupled to a sensor layer, the mask layer comprising a mosaic of infrared light filtering elements and visible spectrum light filtering elements; and
 an infrared light focus layer coupled to the mask layer and comprising a plurality of lenses, each single lens of the plurality of lenses aligned with a corresponding single one of the infrared light filtering elements, the lenses operable for focusing incident infrared light on the infrared light filtering elements.

20. The device of claim 19, wherein the sensor layer comprises a device selected from the group consisting of: a charge-coupled device; and a complementary metal-oxide-semiconductor sensor.

21. The device of claim 19, further comprising a lens that corrects chromatic aberration in the visible spectrum.

22. The device of claim 1, wherein the shutter further comprises sectors between the first and second sectors that are opaque to both the infrared light and the visible spectrum light.

23. The method of claim 16, wherein the sensor outputs a frame of image data in response to exposure to the visible spectrum light and a frame of image data in response to exposure to the infrared light in alternating fashion per each revolution of the shutter.

* * * * *